(12) United States Patent
Nagashima (10) Patent No.: US 10,907,512 B1
(45) Date of Patent: Feb. 2, 2021

(54) ELECTRIC POWER GENERATING SYSTEM

(71) Applicant: Kazuhiko Nagashima, Fukuoka (JP)

(72) Inventor: Kazuhiko Nagashima, Fukuoka (JP)

( * ) Notice: Subject to any disclaimer, the term of this patent is extended or adjusted under 35 U.S.C. 154(b) by 0 days.

(21) Appl. No.: 17/046,712

(22) PCT Filed: Apr. 2, 2019

(86) PCT No.: PCT/JP2019/014656
§ 371 (c)(1),
(2) Date: Oct. 9, 2020

(87) PCT Pub. No.: WO2019/211962
PCT Pub. Date: Nov. 7, 2019

(30) Foreign Application Priority Data

May 2, 2018 (JP) ................................ 2018-088772

(51) Int. Cl.
*F01K 25/00* (2006.01)
*F01K 15/00* (2006.01)
(Continued)

(52) U.S. Cl.
CPC ............ *F01K 25/005* (2013.01); *F01K 15/00* (2013.01); *F01K 27/00* (2013.01); *F03G 7/00* (2013.01)

(58) Field of Classification Search
CPC ........ F01K 25/005; F01K 27/00; F01K 15/00; F03G 7/00
(Continued)

(56) References Cited

U.S. PATENT DOCUMENTS

| 4,226,294 A | 10/1980 | Latter et al. | |
| 4,602,483 A * | 7/1986 | Wilks | F23K 1/02 60/692 |

(Continued)

FOREIGN PATENT DOCUMENTS

| JP | S57-068507 A | 4/1982 |
| JP | S61-002770 B2 | 1/1986 |

(Continued)

OTHER PUBLICATIONS

PCT, International Search Report for the corresponding patent application No. PCT/JP2019/014656, dated Jun. 18, 2019, with English translation.

*Primary Examiner* — Hoang M Nguyen
(74) *Attorney, Agent, or Firm* — Lucas & Mercanti, LLP (57) ABSTRACT

Provided is an electric power generating system which exhibits favorable energy recovery efficiency compared to the prior art and, further, can generate not only cold heat but also warm heat. In an electric power generating system where working fluid is circulated in a system of a pressure resistant closed circuit while changing a state of the working fluid, power is generated by converting external heat energy given to the working fluid into kinetic energy, and electric power is generated by driving an electric power generator by the power, a pressure resistant closed circuit is formed of a main circuit and a sub circuit, the main circuit includes an evaporation chamber, an adiabatic expansion chamber, a power generating part, a warming-use heat exchange mechanism, and a liquefied working fluid return means, and the sub circuit includes a heating medium divided flow path, a liquefied auxiliary fluid supply path, a cooling equipment, a second-fluid-to-be-warmed supply path, a warming equipment, and a return flow compression means.

6 Claims, 3 Drawing Sheets

(51) Int. Cl.
*F03G 7/00* (2006.01)
*F01K 27/00* (2006.01)

(58) Field of Classification Search
USPC .................................................. 60/670–671
See application file for complete search history.

(56) References Cited

U.S. PATENT DOCUMENTS

| | | | |
|---|---|---|---|
| 8,109,096 B2 * | 2/2012 | Schaeffer | F01K 25/06 |
| | | | 60/651 |
| 9,624,792 B2 | 4/2017 | Ruck et al. | |
| 2007/0234750 A1 | 10/2007 | Kalina | |
| 2010/0175638 A1 * | 7/2010 | Haase | F02B 47/02 |
| | | | 123/3 |
| 2011/0167825 A1 * | 7/2011 | Mauran | F01K 27/005 |
| | | | 60/670 |
| 2015/0007568 A1 * | 1/2015 | Chaen | F01K 7/165 |
| | | | 60/645 |

FOREIGN PATENT DOCUMENTS

| | | |
|---|---|---|
| JP | 2001-152813 A | 6/2001 |
| JP | 2001-193419 A | 7/2001 |
| JP | 2001-221015 A | 8/2001 |
| JP | 2013-040606 A | 2/2013 |
| JP | 2013-519862 A | 5/2013 |
| JP | 2013-113235 A | 6/2013 |
| JP | 2017-075594 A | 4/2017 |
| JP | 6295391 B2 | 3/2018 |

\* cited by examiner

ELECTRIC POWER GENERATING SYSTEM

CROSS REFERENCE TO RELATED APPLICATION

This Application is a 371 of PCT/JP2019/014656 filed on Apr. 2, 2019 which, in turn, claimed the priority of Japanese Patent Application No. 2018-088772 filed on May 2, 2018, both applications are incorporated herein by reference.

TECHNICAL FIELD

The present invention relates to an electric power generating system.

BACKGROUND ART

As a representative method for recovering energy by a heat engine conventionally performed, for example, thermal power generation and nuclear power generation and the like are named. These methods are methods where water vapor of high temperature and high pressure is produced by thermal power or nuclear power, and electric power is generated by rotating a turbine using the produced vapor. Heat energy is temporarily converted into kinetic energy, and kinetic energy is recovered as electric energy by working using the kinetic energy. Due to the increase of entropy at the time of releasing internal energy from a system which is physically constrained thus converting the internal energy into kinetic energy, in a conventional technique, it is difficult to increase a recovery efficiency of heat energy. In usual thermal power generation and nuclear power generation, recovery efficiency is merely approximately 30 percent to 40 percent of heat energy.

As other methods for recovering energy, there has been known a method where electric power is generated by recovering renewable energy. For example, there have been conventionally proposed an ocean thermal energy conversion power system, a solar thermal electric conversion system and the like, for example.

However, recovery efficiency of heat energy of these electric power generation methods is further low compared to recovery efficiency of thermal power generation and nuclear power generation, a large energy loss occurs due to a vapor pressure of a low temperature and a low pressure and the supply of sea water which is used as both high heat source sea water and low heat source sea water. Accordingly, an effective recovery efficiency is considerably low and hence, it is difficult to consider that these electric power generation methods will replace thermal power generation and nuclear power generation. Further, such electric power generation methods also have a drawback that a generated amount of electric power is affected by a natural environment such as a climate situation or the like.

In view of the above-mentioned circumstances, the inventor of the present invention has proposed a system previously where a vaporized latent heat of a working fluid is absorbed from a heat source of a room temperature, heat energy is converted into mechanical energy in the process of absorption of the vaporized latent heat, and the mechanical energy is efficiently recovered, and heat energy can be easily discharged to a room temperature by cooling the working fluid, the working of which is finished under a pressure. With such a method, it is possible to provide a system where a cycle in which a liquefied latent heat is discharged to a room temperature is circulated (see patent literature 1 and patent literature 2).

According to this system, for example, heat energy can be stably recovered without being affected by natural environment unlike wind power generation, photovoltaic power generation or the like, and electric power can be generated efficiently by making use of this heat energy.

CITATION LIST

Patent Literature

Patent Literature 1: JP 2013-040606 A
Patent Literature 2: JP 6295391 B2

SUMMARY OF INVENTION

Technical Problem

This system which the inventor of the present invention proposed in the past is an extremely excellent system with respect to a point that energy which a heat source such as water at a room temperature obtained from sea or river or air at a room temperature derived from atmospheric air is converted into kinetic energy, and electric power is generated by using the kinetic energy.

However, this excellent system also has the room for improvement from a viewpoint of efficiency.

In the conventional system which the inventor of the present invention proposed, using a working fluid which circulates in the system as a cold heat source, it is possible to provide cold water and refrigerating/freezing equipment and the like. However, the system is not applicable to generation of warm heat.

The present invention has been made in view of the above-mentioned circumstances, and it is an object of the present invention to provide an electric power generating system which exhibits favorable energy recovery efficiency compared to the prior art and, further, can generate not only cold heat but also warm heat.

Solution to Problem

To overcome the above-mentioned drawbacks, an electric power generating system according to the present invention, there is provided an electric power generating system where working fluid is circulated in a system of a pressure resistant closed circuit while changing a state of the working fluid, power is generated by converting external heat energy given to the working fluid into kinetic energy, and electric power is generated by driving an electric power generator by the power, wherein the pressure resistant closed circuit includes a main circuit and a sub circuit connected to the main circuit in parallel, the main circuit includes: an evaporation chamber in which the working fluid in a gas phase and the working fluid in a liquid phase are stored at a temperature near a boiling point and in which a heat exchange can be performed between a heating-use fluid and the working fluid in the liquid phase; an adiabatic expansion chamber configured to liquefy the working fluid supplied from the evaporation chamber due to lowering of a temperature brought about by adiabatic expansion, and a heat exchange can be performed between the working fluid which cannot be liquefied by the adiabatic expansion and a liquefied auxiliary fluid; a power generating part which includes: a power generating means interposed on an intermediate portion of a working fluid flow path which is communicated between the evaporation chamber and the adiabatic expansion chamber; and an electric power generating means configured to generate electric power by power generated by the power generating means; a warming-use heat exchange mechanism disposed on an intermediate portion of the working fluid flow path which is communicated between the adiabatic expansion chamber and the evaporation chamber, the warming-use heat exchange mechanism configured to warm the working fluid which forms a first fluid to be warmed and a second fluid to be warmed by performing a heat exchange between the working fluid and a warming-use fluid supplied from outside a system of the pressure resistant closed circuit; and a liquefied working fluid return means configured to return the working fluid liquefied by the adiabatic expansion chamber to the evaporation chamber through the warming-use heat exchange mechanism, wherein the sub circuit includes; a heating medium dividing flow path configured to divide a portion of the working fluid from the working fluid flow path between the evaporation chamber and the power generating part, and configured to supply a divided portion of the working fluid as a heating medium; a liquefied auxiliary fluid supply path configured to lower a temperature of a divided portion of the heating medium by decreasing a pressure of the divided portion of the heating medium, and configured to supply the divided portion of the heating medium to the adiabatic expansion chamber as the liquefied auxiliary fluid; a cooling equipment configured to lower a temperature of the other portion of the divided heating medium by reducing a pressure thus forming the divided heating medium into a refrigerant; a second fluid-to-be-warmed supply path configured to supply a heating medium which passes through the adiabatic expansion chamber and the cooling equipment to the warming-use heat exchange mechanism as the second fluid to be warmed; a warming equipment configured to compress the heating medium warmed by the warming-use heat exchange mechanism so as to set a temperature of the heating medium to a higher temperature, and configured to use the heating medium having the higher temperature as a heating medium; and a return flow compression means interposed on a heating medium return flow path where a heating medium which passes through the warming equipment is merged to the working fluid flow path between the evaporation chamber and the power generating part, and configured to compress the heating medium to a pressure equal to or more than a pressure of the working fluid which passes through a working fluid flow path between the evaporation chamber and the power generating part.

The electric power generating system according to the present invention also has the following technical features.

(2) The electric power generating system further includes a heating medium distributing path configured to supply a portion of the heating medium warmed by the warming-use heat exchange mechanism to the warming equipment, and configured to compress a remaining portion of the heating medium warmed by the warming-use heat exchange mechanism thus forming a higher temperature remaining portion of the heating medium and to supply the higher temperature remaining portion of the heating medium to the evaporation chamber as heating-use fluid.

(3) The electric power generating system includes:

a water electrolysis device configured to generate hydrogen and oxygen by electrolyzing water by a portion of electric power obtained by the power generating part;

and a combustion device configured to obtain heat by combusting generated hydrogen and oxygen, wherein predetermined fluid is heated by heat obtained by the combustion device, and the fluid is supplied to the evaporation chamber as a heating-use fluid.

(4) The electric power generating system is configured such that heating-use fluid which passes through the evaporation chamber is supplied to the warming-use heat exchange mechanism as the warming-use fluid.

(5) The electric power generating system includes a storage equipment which stores hydrogen and oxygen generated by the water electrolysis device.

(6) The electric power generating system is configured such that electric power is generated by driving a turbine using vapor generated by heating of water using heat obtained by the combustion device, and distilled water is obtained by condensing vapor obtained from the turbine.

Advantageous Effects of Invention

The electric power generating system according to the present invention is an electric power generating system where working fluid is circulated in a system of a pressure resistant closed circuit while changing a state of the working fluid, power is generated by converting external heat energy given to the working fluid into kinetic energy, and electric power is generated by driving an electric power generator by the power, wherein the pressure resistant closed circuit includes a main circuit and a sub circuit connected to the main circuit in parallel, the main circuit includes: an evaporation chamber in which the working fluid in a gas phase and the working fluid in a liquid phase are stored at a temperature near a boiling point and in which a heat exchange can be performed between a heating-use fluid and the working fluid in the liquid phase; an adiabatic expansion chamber configured to liquefy the working fluid supplied from the evaporation chamber due to lowering of a temperature brought about by adiabatic expansion, and in which a heat exchange can be performed between the working fluid which cannot be liquefied by the adiabatic expansion and a liquefied auxiliary fluid; a power generating part which includes: a power generating means interposed on an intermediate portion of a working fluid flow path which is communicated between the evaporation chamber and the adiabatic expansion chamber; and an electric power generating means configured to generate electric power by power generated by the power generating means; a warming-use heat exchange mechanism disposed on an intermediate portion of the working fluid flow path which is communicated between the adiabatic expansion chamber and the evaporation chamber, the warming-use heat exchange mechanism configured to warm the working fluid which forms a first fluid to be warmed and a second fluid to be warmed by performing a heat exchange between the working fluid and a warming-use fluid supplied from outside a system of the pressure resistant closed circuit; and a liquefied working fluid return means configured to return the working fluid liquefied by the adiabatic expansion chamber to the evaporation chamber through the warming-use heat exchange mechanism, wherein the sub circuit includes; a heating medium dividing flow path configured to divide a portion of the working fluid from a working fluid flow path between the evaporation chamber and the power generating part, and configured to supply a divided portion of the working fluid as a heating medium; a liquefied auxiliary fluid supply path configured to lower a temperature of a divided portion of the heating medium by decreasing a pressure of the divided portion of the heating medium, and configured to supply the divided portion of the heating medium to the adiabatic expansion chamber as the liquefied auxiliary fluid; a cooling equipment configured to lower a temperature of the other portion of the divided heating medium by reducing a pressure thus forming the divided heating medium into a refrigerant; a second fluid-to-be-warmed supply path configured to supply a heating medium which passes through the adiabatic expansion chamber and the cooling equipment to the warming-use heat exchange mechanism as the second fluid to be warmed; a warming equipment configured to compress the heating medium warmed by the warming-use heat exchange mechanism so as to set a temperature of the heating medium to a higher temperature, and configured to use the heating medium having the higher temperature as a heating medium; and a return flow compression means interposed on a heating medium return flow path where a heating medium which passes through the warming equipment is merged to the working fluid flow path between the evaporation chamber and the power generating part, and is configured to compress the heating medium to a pressure equal to or more than a pressure of the working fluid which passes through a working fluid through path between the evaporation chamber and the power generating part. Accordingly, it is possible to provide an electric power generating system which exhibits favorable energy recovery efficiency compared to the prior art and, further, can generate not only cold heat but also warm heat.

DESCRIPTION OF EMBODIMENTS

The present invention provides the electric power generating system where working fluid is circulated in a system of a pressure resistant closed circuit while changing a state of the working fluid into liquid or gas, power is generated by converting external heat energy given to the working fluid into kinetic energy, and electric power is generated by driving an electric power generator by the power (kinetic energy). The present invention provides an electric power generating system which exhibits favorable energy recovery efficiency compared to the prior art and, further, can generate not only cold heat but also warm heat.

In this system, working fluid which is circulated in the pressure resistant closed circuit is not particularly limited, and a substance which is used as a refrigerant in general, more specifically, a substance which has excellent chemical stability, is a gas under a room temperature and a normal pressure and has a property of being liable to be liquefied can be preferably used. To exemplify such a working fluid, propane, butane, chlorofluorocarbon or ammonia can be named, for example.

A quantity of external heat energy is not particularly limited. However, it is necessary to secure a temperature difference at a level which allows the external heat energy to give heat to working fluid by a warming-use heat exchange mechanism described later.

A state, that is, a gas state, a liquid state or a solid state of a supply medium which supplies external heat energy is not particularly limited. In many cases, the use of liquid and gas which have fluidity is advantageous. As such a supply medium for supplying external heat energy, for example, sea water, river water, water stored in a dam, or atmospheric air can be used.

In this system which generates power or generates electric power by circulating working fluid which holds external heat energy supplied from such a supply medium is formed of the main circuit and the sub circuit, the pressure resistant closed circuit is formed by the main circuit and the sub circuit. The main circuit includes the evaporation chamber, the adiabatic expansion chamber, the power generating part, the warming-use heat exchange mechanism, and the liquefied working fluid return means. The sub circuit includes the heating medium divided flow path, the liquefied auxiliary fluid supply path, the cooling equipment, the second-fluid-to-be-warmed supply path, the warming equipment, and the return flow compression means. The present invention provides the pressure resistant closed circuit structure for an electric power generating system which can generate electric power more efficiently compared to the prior art, and can supply warm heat.

First, the evaporation chamber of the main circuit stores working fluid having a temperature near a boiling point is stored in a pressure vessel to which a heat insulating structure is applied in a gas phase and a liquid phase in a gas-liquid equilibrium state. Although a ratio between a capacity of a gas phase and a capacity of a liquid phase in the evaporation chamber is influenced by a kind of working fluid to be used, a temperature of a supply medium and the like, in general, it is desirable the ratio falls within a range of gas phase:liquid phase=10 parts by volume: 1 parts by volume to 5 parts by volume: 1 part by volume.

The evaporation chamber is configured to perform a heat exchange between predetermined heating-use fluid in the system of the pressure resistant closed circuit or supplied from the outside of the system and working fluid in a liquid phase, and is capable of giving heat energy corresponding to a difference in temperature between heating-use fluid and working fluid to working fluid. In other words, in this system, it is safe to say that the evaporation chamber is one of the most important components also with the warming-use heat exchange mechanism described later as a part which forms an inlet of the external heat energy.

With respect to working liquid in the evaporation chamber, heating-use fluid constantly flows through and hence, where there is no pressure change in an evaporation chamber gas phase, a state is ensured where a temperature equilibrium is substantially held between heating-use fluid and working fluid, and gas-liquid equilibrium is substantially held between a gas phase and a liquid phase of working fluid (when a loss of heat or the like ignored).

On the other hand, when a pressure of a gas phase in the evaporation chamber is lowered because of functioning of a liquefied working fluid return means or the like described later, working fluid in a liquid phase is evaporated so as to compensate a pressure in a gas phase thus establishing a gas-liquid equilibrium. Energy corresponding to a temperature lowered due to vaporization of a liquid phase is given from a supply medium due to a heat exchange performed in the warming-use heat exchange mechanism or in the evaporation chamber.

That is, although a temperature and a pressure change exists more or less, a temperature equilibrium between a supply medium and working fluid in a liquid phase, and a gas-liquid equilibrium in the evaporation chamber can be maintained as much as possible.

As one example, when liver water or sea water having a temperature of 20 to 30° C. (for example, 25° C.) is adopted as an external heat energy supply medium, and propane is adopted as working fluid (hereinafter, also referred to as a propane condition), a temperature of a working fluid in a liquid phase in the evaporation chamber can be set to 70 to 90° C. (for example, 80° C.) due to a heat exchange between working fluid and heating-use fluid in the evaporation chamber, and a pressure of working fluid in a gas phase can be set to 23 to 33 atmospheric pressure (for example, 28 atmospheric pressure).

The adiabatic expansion chamber is a part where working fluid supplied from the evaporation chamber is liquefied due to lowering of a temperature brought about by adiabatic expansion.

That is, a pressure in the adiabatic expansion chamber is set lower than an inner pressure of the evaporation chamber, and such a pressure difference is set to an atmospheric pressure difference at which working fluid in a gas state can be liquefied by adiabatic expansion.

For example, under the propane condition described previously, a temperature of working fluid stored in the adiabatic expansion chamber is set to approximately −42 to −10° C. (for example, −10° C.), and a pressure of working fluid in a gas phase is set to approximately 1.5 to 2.5 atmospheric pressure (for example, 2 atmospheric pressure) so that working fluid which passes through the power generating part described later is liquefied.

A capacity of the adiabatic expansion chamber differs depending on a kind of working fluid used in the system, a temperature of a supply medium and the like. However, it is sufficient that the adiabatic expansion chamber have a capacity which can ensure a volume necessary for liquefying most of inflow working fluid by expansion of working fluid.

The power generating part is interposed on the intermediate portion which is connected between the evaporation chamber and the adiabatic expansion chamber, and is formed of: the power generating means; and the electric power generating means which generates electric power by power generated by the power generating means.

As the power generating means, for example, a reciprocating adiabatic cylinder or a turbine can be named.

The reciprocating adiabatic cylinder which is adaptable as the power generating means is a cylinder which is operable in a reciprocating manner and has a heat insulating structure. The reciprocating adiabatic cylinder is driven by working fluid in a gas phase supplied from the evaporation chamber and can obtain kinetic energy.

With respect to the turbine which forms the power generating means in the power generating part, for example, by arranging the turbine which rotates due to a contact between the turbine and working fluid which flows by a pressure difference between a pressure on an evaporation chamber side and a pressure on an adiabatic expansion chamber side in the turbine chamber interposed on an intermediate portion of the working fluid flow path which makes the evaporation chamber and the adiabatic expansion chamber communicate with each other, power can be supplied to the electric power generating means. Particularly, by adopting the turbine, it is possible to have an advantageous effect that continuous power generation can be realized.

The warming-use heat exchange mechanism is a heat exchanger disposed on an intermediate portion of the working fluid flow path which communicably connects the adiabatic expansion chamber and the liquefied working fluid return means to each other. The warming-use heat exchange mechanism plays a role of warming working fluid and heating medium by performing a heat exchange between warming-use fluid supplied from the outside of the system of the pressure resistant closed circuit and working fluid liquefied in the adiabatic expansion chamber and heating medium described later. The warming-use heat exchange mechanism may be formed of one set of a heat exchanger or may be formed by connecting a plurality of heat exchangers in series in multiple stages.

The liquefied working fluid return means is provided for returning working fluid liquefied in the adiabatic expansion chamber into the evaporation chamber.

The liquefied working fluid return means is provided for returning working fluid in a liquid phase in the adiabatic expansion chamber against a pressure difference between a pressure in the adiabatic expansion chamber and a pressure in the evaporation chamber. A liquid supply pump having excellent liquid tightness and pressure resistant property can be adopted as the liquefied working fluid return means.

Next, the sub circuit is described. The sub circuit includes the heating medium divided flow path, the liquefied auxiliary fluid supply path, the cooling equipment, the second-fluid-to-be-warmed supply path, the warming equipment, and the return flow compression means.

The sub circuit is a circuit which is connected in parallel with the working fluid flow path which is connected between the evaporation chamber and the power generating part disposed on the main circuit. The sub circuit is a circuit formed by branching a portion of working fluid which flows through the main circuit and by supplying the portion of working fluid as heating medium thus mainly performing cooling or warming.

The heating medium divided flow path is a flow path provided for diving a portion of working fluid from the working fluid flow path between the evaporation chamber and the power generating part as a heating medium, and plays a role of a flow path which forms an introducing portion of heating medium (working fluid) in the sub circuit.

The liquefied auxiliary fluid supply path is a flow path provided for lowering a temperature of a portion of heating medium divided from the main circuit through the heating medium divided flow path by decreasing a pressure of the portion of the divided heating medium, and for supplying the portion of the divided heating medium to the adiabatic expansion chamber as liquefied auxiliary fluid.

That is, the liquefied auxiliary fluid supply path is one of flow paths divided from the heating medium divided flow path. A pressure reducing means such as a pressure reducing valve which lowers a temperature of heating medium by lowering a pressure of heating medium by expansion is interposed on an intermediate portion of the liquefied auxiliary fluid supply path, and a temperature-lowered heating medium in a gas state is supplied to a heat exchanging part of the adiabatic expansion chamber as a liquefied auxiliary fluid which functions as a refrigerant.

The cooling equipment is equipment which lowers a temperature of the other portion of the heating medium divided from the main circuit through the heating medium divided flow path by reducing a pressure of the other portion of the heating medium, and performs cooling using the heating medium as a refrigerant. A pressure reducing means such as a pressure reducing valve which lowers a temperature of the heating medium by lowering a pressure of the heating medium by expansion is interposed on an introducing portion of the cooling equipment for introducing the heating medium, and an article or the like is cooled by using a temperature lowered heating medium in a gas state as a refrigerant. The cooling equipment is not particularly limited. For example, the cooling equipment may be a freezer or a refrigerator.

The second-fluid-to-be-warmed supply path is a flow path provided for supplying a heating medium which has passed through the adiabatic expansion chamber and the cooling equipment to the warming-use heat exchange mechanism as second fluid to be warmed.

That is, the second-fluid-to-be-warmed supply path is a multi-brunched (for example, bifurcated) merged path (hereinafter, also referred to as multi-branched merged path) which merges heating medium which flows out from the heat exchanging part of the adiabatic expansion chamber and heating medium which flows out through the cooling equipment, and introduces merged heating medium into the heating heat exchange mechanism as second fluid to be warmed. At a flow path portion corresponding to a branch of the second-fluid-to-be-warmed supply path upstream of the merged portion (hereinafter, also referred to as a branch path), a pressurizing means such a pressurizing pump may be suitably provided for matching pressures or the like in merging both heating mediums.

The warming equipment is equipment provided for performing warming using heating medium, a temperature of which is further increased by compressing the heating medium warmed by warming-use heat exchange mechanism, as a heating medium. The warming equipment is not particularly limited. For example, the warming equipment may be a hot storage, a plant cultivation house or equipment which produces hot water.

The return flow compression means is interposed on the heating medium return flow path which merges heating medium which has passed through the warming equipment to the working fluid flow path between the evaporation chamber and the power generating part, and is provided for compressing the heating medium until a pressure of the heating medium becomes equal to or more than a pressure of working fluid which flows through the working fluid flow path between the evaporation chamber and the power generating part.

According to the electric power generating system provided with the pressure resistant sealed circuit such a main circuit and a sub circuit, it is possible to provide an electric power generating system which exhibits favorable energy recovery efficiency compared to the prior art and, further, can generate not only cold heat but also warm heat.

Particularly, in the sub circuit, heating medium which has passed through the adiabatic expansion chamber and the cooling equipment is warmed by introducing heating medium into the warming-use heat exchange mechanism as the second fluid to be warmed while maintaining a gas state. Accordingly, when heating medium is compressed in the warming equipment or the heating medium distributing path described later, large heat can be generated and hence, heat energy of warming-use fluid supplied from the outside of the system of the pressure resistance closed circuit can be efficiently used.

The electric power generating system according to the embodiment may include, in the sub circuit, the heating medium distributing path which supplies a portion of the heating medium warmed by the warming-use heat exchange mechanism by compression to the warming equipment, compresses a remaining portion of the heating medium warmed by the warming-use heat exchange mechanism thus forming a higher temperature remaining portion of the heating medium, and supplies the higher temperature remaining portion of the heating medium to the evaporation chamber as a heating-use fluid.

With such a configuration, heating medium which obtains heat energy from warming-use fluid by the warming-use heat exchange mechanism can be supplied to the heat exchanging part of the evaporation chamber as heating medium and hence, working fluid can be further efficiently heated whereby larger electric power can be obtained in the power generating part.

The electric power generating system according to the embodiment may include: the water electrolysis device which generates hydrogen and oxygen by electrolyzing water by a portion of electric power obtained by the power generating part; and a combustion device which obtains heat by combusting generated hydrogen and oxygen, wherein predetermined fluid is heated by heat obtained by the combustion device, and the fluid is supplied to the heat exchanging part of the evaporation chamber as a heating-use fluid. Predetermined fluid is not particularly limited, and may be water, oil, for example.

Also with such a configuration, working fluid can be further efficiently heated and hence, larger electric power can be obtained in the power generating part.

The heating-use fluid which has passed through the evaporation chamber may be supplied to the warming-use heat exchange mechanism as the warming-use fluid.

That is, water which is heating fluid obtained by being heated by heat obtained by the combustion device and passing through the heat exchanging part of the evaporation chamber may be directly supplied to the warming-use heat exchange mechanism as warming-use fluid. Alternatively, such water may be merged with sea water, river water or the like supplied from the outside of the system of the pressure resistant closed circuit and the merged fluid may be supplied to the warming-use heat exchange mechanism as warming-use fluid.

With such a configuration, heat energy can be given to working fluid which is first fluid to be warmed by the warming-use heat exchange mechanism so that electric power can be generated more efficiently. Further, heat energy can be also given to heating medium which is the second fluid to be warmed by the warming-use heat exchange mechanism so that warming ability of the warming equipment can be further enhanced.

The electric power generating system may further include the storage equipment which stores hydrogen and oxygen generated by the water electrolysis device, and oxygen and hydrogen stored in the storage equipment may be combusted by the combustion device as fuel.

With such a configuration, for example, when surplus electric power is generated in the power generating part, the energy can be stored in a state of hydrogen and oxygen, and the energy can be used for other purposes when necessary.

Electric power may be generated by driving the turbine using vapor generated by heating water using heat obtained by the combustion device, and distilled water may be obtained by condensing vapor obtained through the turbine.

With such a configuration, for example, assuming water used for generating vapor is sea water or the like, fresh water can be produced from sea water or the like by making use of a portion of generated electric power, and fresh water can be used for beverages and other various applications.

Hereinafter, the electric power generating system according to the embodiment is further described with reference to drawings. The description is made by taking a case where propane is adopted as working fluid. However, a kind of working fluid is not limited to propane as described previously.

Figure 1:
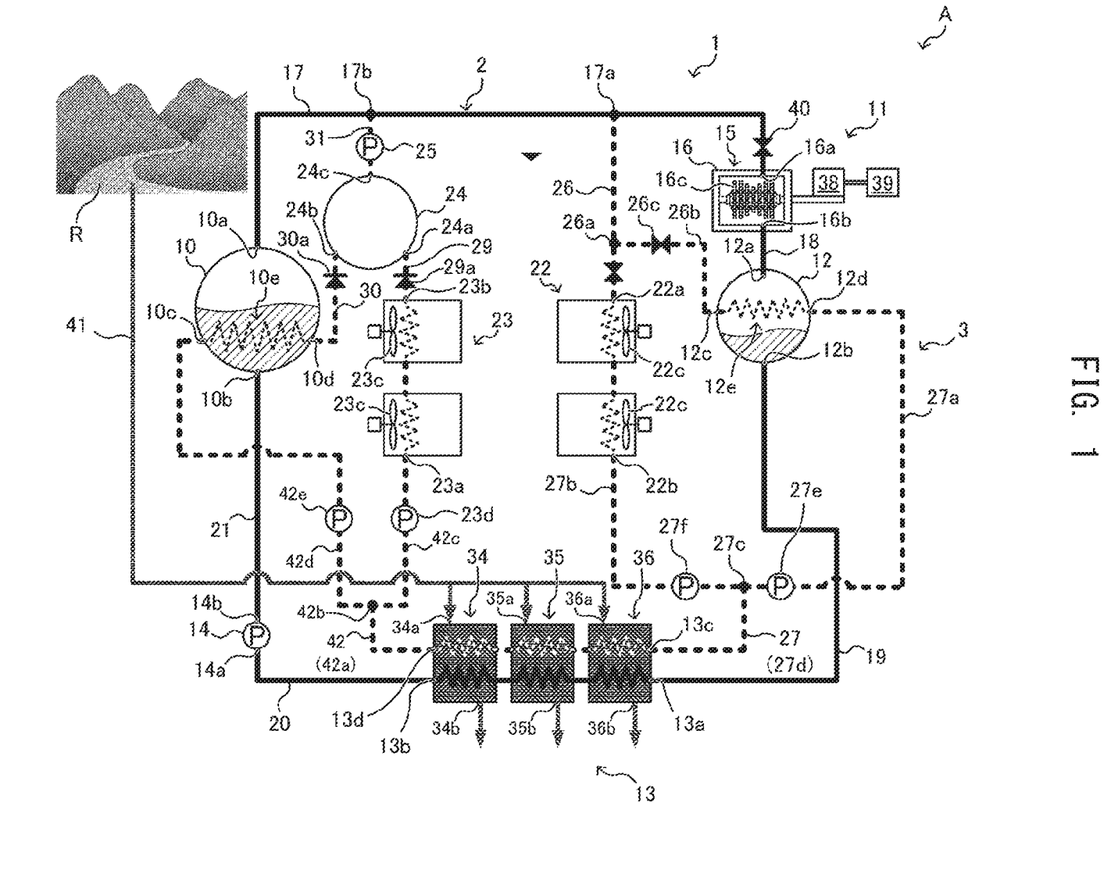
FIG. 1 is an explanatory view showing a configuration of an electric power generating system according to an embodiment.

FIG. 1 relates to the entire configuration of an electric power generating system A according to this embodiment, and is a conceptual view showing respective configurations, pipes and the like in a simplified manner. As shown in FIG. 1, a pressure resistant closed circuit 1 includes a main circuit 2 indicated by a bold solid line, and a sub circuit 3 indicated by a bold broken line.

The main circuit 2 includes an evaporation chamber 10, a power generating part 11, an adiabatic expansion chamber 12, a warming-use heat exchange mechanism 13, and a return pump 14. The main circuit 2 is formed by communicably connecting these components on a working fluid flow path.

Further, the working fluid flow path includes: a working fluid gas supply pipe 17 which is connected between a gas phase outlet 10a of the evaporation chamber 10 and a supply port 16a of a turbine chamber 16 of a turbine device 15 which forms the power generating part 11; a working fluid gas discharge pipe 18 which is connected between a discharge port 16b of the turbine chamber 16 and an expansion chamber inlet 12a of the adiabatic expansion chamber 12; a first-fluid-to-be-warmed supply pipe 19 which is connected between an expansion chamber outlet 12b of the adiabatic expansion chamber 12 and a first inlet 13a of the warming-use heat exchange mechanism 13; a return pump supply pipe 20 which is connected between a first outlet 13b of the warming-use heat exchange mechanism 13 and an inlet 14a of the return pump 14; and a return pipe 21 which is connected between a pump-out port 14b of the return pump 14 and a liquid phase inlet 10b of the evaporation chamber 10.

The sub circuit 3 includes cooling equipment 22, warming equipment 23, a pressure adjustment tank 24, and a return flow compression pump 25, and the sub circuit 3 is formed by communicably connecting these components to each other on a heating medium flow path.

The heating medium flow path includes: a heating medium dividing and distributing pipe 26 which is connected between an intermediate portion 17a of the working fluid gas supply pipe 17 of the main circuit 2, a heating part inlet 12c of the adiabatic expansion chamber 12, and an inlet 22a of the cooling equipment 22; a refrigerant merge and supply pipe 27 which is connected between a heating part outlet 12d of the adiabatic expansion chamber 12, an outlet 22b of the cooling equipment 22, and a second inlet 13c of the warming-use heat exchange mechanism 13; a heating medium distributing pipe 28 which is connected between a second outlet 13d of the warming-use heat exchange mechanism 13, an inlet 23a of the warming equipment 23, and a heating part inlet 10c of the evaporation chamber 10; adjustment tank supply pipes 29, 30 which are connected between an outlet 23b of the warming equipment 23 and an inlet 24a of the pressure adjustment tank 24 and between a heating part outlet 10d of the evaporation chamber 10 and an inlet 24b of the pressure adjustment tank 24; and a heating medium return flow pipe 31 which is connected between a discharge port 24c of the pressure adjustment tank 24 and an intermediate portion 17b of the working fluid gas supply pipe 17 of the main circuit 2.

In the electric power generating system A, the warming-use heat exchange mechanism 13 plays a role of supplying and receiving of heat energy between a working fluid which circulates in the pressure resistant closed circuit 1 and a fluid outside the system of the pressure resistant closed circuit 1.

The warming-use heat exchange mechanism 13 includes first to third warming-use heat exchangers 34, 35, 36 which are sequentially interposed in multiple stages in series from an upstream side between the first-fluid-to-be-warmed supply pipe 19 and the return pump supply pipe 20. The warming-use heat exchange mechanism 13 is formed by communicably connecting these components to each other.

In the first to third warming-use heat exchangers 34, 35, 36, inlets 34a, 35a, 36a and outlets 34b, 35b, 36b for a warming-use fluid are disposed. The warming-use fluid gives externally acquired heat energy to a working fluid which forms a first fluid to be warmed, and a heating medium which forms a second fluid to be warmed.

Warming-use fluid supply pipes 37 are respectively connected to the respective inlets 34a, 35a, 36a, and river water having a temperature of 10 to 20° C. can be supplied as a warming-use fluid particularly in this embodiment.

The warming-use heat exchange mechanism 13 is configured such that river water to which a heat exchange is applied in the first to third warming-use heat exchangers 34, 35, 36 is discharged from the respective outlets 34b, 35b, 36b.

Next, the respective components of the pressure resistant closed circuit 1 (the main circuit 2 and the sub circuit 3) are described. First, by focusing on a temperature and a change in state of working fluid, the main circuit 2 is described and, thereafter, the sub circuit 3 is described.

The evaporation chamber 10 is formed of a sealed pressure resistant vessel to which heat insulation treatment is applied and where a gas phrase capacity is approximately 100 parts by volume. Propane in a liquid state (hereinafter, referred to as liquefied propane) and propane in a gas state (hereinafter, referred to as propane gas) are stored in the evaporation chamber 10 as working fluid. A volume ratio between liquefied propane and propane gas stored in the evaporation chamber 10 is set to approximately 1:10 to 1:5, and a pressure of propane gas is set to approximately 7 to 9.5 atmospheric pressure at the time of operating the electric power generating system.

A heat exchanging part 10e which makes a temperature of liquefied propane approach a temperature of heating-use fluid by a heat exchange is disposed in the vicinity of a bottom portion of the evaporation chamber 10, that is, at a portion which is immersed in the stored liquefied propane.

Heating-use fluid which flows in the heat exchanging part 10e is a heating medium (heat medium) a temperature of which is increased by adiabatic compression through the warming-use heat exchange mechanism 13. In this embodiment, when the operation of the electric power generating system is started and is brought into a stable state, propane gas having a temperature of approximately 80 to 90° C. (for example, 85° C.) and an approximately 28 to 33 atmospheric pressure (for example, 30 atmospheric pressure) is supplied.

A proximal end of the working fluid gas supply pipe 17 faces a gas phase region of the evaporation chamber 10 in which propane gas is filled thus forming a gas phase outlet 10a.

A distal end side of a working fluid gas supply pipe 17 is connected to the turbine device 15 of the power generating part 11.

More specifically, a downstream end portion of the working fluid gas supply pipe 17 is connected to the supply port 16a of the turbine chamber 16 so as to rotate the turbine 16c. A shaft of the turbine 16c is made to function as an output part of power, and generated power is used as a rotational force. The rotational force is transmitted to an electric power generator 39 which forms an electric power generating means by way of a transmission 38, and the electric power generator 39 can continuously generate electric power. Symbol 40 indicates a flow rate regulating valve for regulating a flow rate of working fluid supplied to the turbine chamber 16.

Working fluid supplied to the turbine chamber 16 is discharged from the discharge port 16b, and is introduced into the adiabatic expansion chamber 12 from the expansion chamber inlet 12a through the working fluid gas discharge pipe 18.

The adiabatic expansion chamber 12 is a part which is formed of a sealed pressure resistant vessel of approximately 2 to 3 parts by volume to which heat insulation treatment is applied, and is provided for liquefying propane gas discharged from the turbine chamber 16 by adiabatic expansion.

A pressure of propane gas introduced into the adiabatic expansion chamber 12 through the working fluid gas discharge pipe 18 is reduced to approximately 1.5 to 2.5 atmospheric pressure, and a temperature of propane gas is lowered to −42 to −10° C. so that most of propane gas is liquefied. Accordingly, in the adiabatic expansion chamber 12, there exist a liquid phase formed of liquefied propane generated by adiabatic expansion and a gas phase formed in a region above the liquid phase.

At a portion of a gas phase part of the adiabatic expansion chamber 12 where working fluid flowing into the adiabatic expansion chamber 12 from an expansion chamber inlet 12a is brought into contact with propane gas, a heat exchanging part 12e which accelerates liquefying of propane gas by a heat exchange between a heating medium flowing into the adiabatic expansion chamber 12 from the heating part inlet 12c and propane gas is disposed.

An expansion chamber outlet 12b is formed on a bottom portion of the adiabatic expansion chamber 12. Liquefied propane can be supplied to the warming-use heat exchange mechanism 13 as a first fluid to be warmed through a first-fluid-to-be-warmed supply pipe 19 from the expansion chamber outlet 12b through a first-fluid-to-be-warmed supply pipe 19 which communicates with a first inlet 13a of a warming-use heat exchange mechanism 13.

The warming-use heat exchange mechanism 13 includes first to third warming-use heat exchangers 34, 35, 36 which are sequentially interposed in multiple stages in series from an upstream side between the first-fluid-to-be-warmed supply pipe 19 and the return pump supply pipe 20. The warming-use heat exchange mechanism 13 is formed by communicably connecting these warming-use heat exchanger 34, 35, 36 by a heat exchange medium flow path.

The first to third warming-use heat exchangers 34, 35, 36 are respectively configured to allow the supply of warming-use fluid to the first to third warming-use heat exchanger 34, 35, 36. Heating-use fluid supplied to the first to third warming-use heat exchangers 34, 35, 36 is river water taken into the heat exchangers 34, 35, 36 through a warming fluid supply pipe 41. In this embodiment, for example, river water having a temperature of approximately 10 to 20° C. which flows down in river R by making use of a difference in height brought about by a mountain or the like is used.

Each of the first to third warming-use heat exchangers 34, 35, 36 includes: a first-fluid-to-be warmed heat exchanging part indicated by a bold solid line; and a second-fluid-to-be warmed heat exchanging part indicated by a bold broken line. A heat exchange is performed between liquefied propane which is first fluid to be warmed and is working fluid and propane gas which is second fluid to be warmed and is heating medium, and river water which is warming-use fluid.

In this embodiment, liquefied propane having a temperature of −42 to −10° C. flown into the first to third warming-use heat exchanger 34, 35, 36 from the first inlet 13a as the first fluid to be warmed is heated to a temperature of 10 to 20° C. by a heat exchange at the respective first-fluid-to-be-warmed exchange portions of the first to third warming-use heat exchangers 34, 35, 36, and heated liquefied propane is flown out from the first outlet 13b. In the same manner, a propane gas having a temperature of −10 to 10° C. which is flown into the first to third warming-use heat exchanger 34, 35, 36 from the second inlet 13c as second fluid to be warmed is warmed to a temperature of 10 to 20° C. by a heat exchange, and warmed propane gas is flown out from the second outlet 13d.

That is, heat energy which river water possesses is given to the first and second fluids to be warmed.

On the other hand, river water having a temperature of 10 to 20° C. flown into the first to third warming-use heat exchangers 34, 35, 36 as warming fluid is discharged from discharge ports 36b, 35b, 34b in a state where river water having a temperature of 10 to 20° C. in a state where river water is cooled to a temperature of 5 to 1° C. in the third warming-use heat exchanger 36, river water is cooled to a temperature of 5 to 10° C. in the second warming-use heat exchanger 35, and river water is cooled to a temperature of 10 to 20° C. in the first warming-use heat exchanger 34. Respective river waters discharged in a cooled state can be used as respective cooling heat sources.

Working fluid which is discharged from the warming-use heat exchange mechanism 13 through the first outlet 13b reaches an inlet 14a of the return pump 14 through the return pump supply pipe 20. The return pump 14 is a pump for increasing a pressure of working fluid to a level that working fluid can flow into the evaporation chamber 10 so as to enable returning of working fluid to the evaporation chamber 10. Working fluid which is discharged from the pump-out port 14b returns into the evaporation chamber 10 from the liquid phase inlet 10b through the return pipe 21.

Next, the sub circuit 3 is described. The sub circuit 3 is a circuit connected in parallel to a working fluid gas supply pipe 17 portion. The sub circuit 3 has a proximal end at an intermediate portion 17a of the working fluid gas supply pipe 17, and has a terminal end at an intermediate portion 17b of the working fluid gas supply pipe 17.

The heating medium dividing and distributing pipe 26 is formed of a bifurcated distribution pipe where a branch pipe is branched from a trunk pipe. The trunk pipe portion plays a role of a heating medium dividing flow path where a part of working fluid from the working fluid gas supply pipe 17 between the evaporation chamber 10 and the power generating part 11 is branched as a heating medium.

A portion of divided heating medium (working fluid) reaches one branch pipe 26b connected to a heating part inlet 12c of the adiabatic expansion chamber 12 through a distribution portion 26a.

The branch pipe 26b plays a role of a liquefying assist fluid supply path through which a temperature of the distributed heating medium is lowered by reducing a pressure of the heating medium and the temperature lowered heating medium is supplied to a heat exchanging part 12e of the adiabatic expansion chamber 12 as a liquefied auxiliary fluid. A pressure reducing valve 26c which reduces a pressure of the heating medium is interposed on the branch pipe 26b. Particularly, in this embodiment, the heating medium becomes propane gas having a temperature of −40 to −45° C. by the pressure reducing valve 26*c*, and the propane gas is supplied to the heat exchanging part 12*e* as a refrigerant.

Accordingly, in the adiabatic expansion chamber 12, liquefying of a portion of working fluid which flows into the adiabatic expansion chamber 12 through the adiabatic expansion chamber inlet 12*a* but is not liquefied by adiabatic expansion is accelerated so that the reliable liquefying of working fluid can be realized.

The other portion of the heating medium distributed at the distribution portion 26*a* of the heating medium dividing and distributing pipe 26 reaches the other branch pipe 26*d*. The branch pipe 26*d* is connected to an inlet 22*a* of the cooling equipment 22.

A pressure reducing valve 26*e* is disposed on an intermediate portion of the cooling equipment 22. With such a configuration, heating medium can be supplied to the cooling equipment 22 as a refrigerant after being expanded by the pressure reducing valve 26*e*.

A heating medium flow path formed in a shape which realizes a high heat exchange ratio is exposed in the cooling equipment 22, and the inside of the cooling equipment 22 can be cooled by driving a fan 22*c* disposed in each cooling equipment 22.

Heating medium discharged from a heating part outlet 12*d* of the adiabatic expansion chamber 12 and heating medium discharged from an outlet 22*b* of the cooling equipment 22 reach a refrigerant merge and supply pipe 27.

The refrigerant merge and supply pipe 27 is a pipe which plays a role of a second-fluid-to-be-warmed supply path which supplies heating mediums which pass through the adiabatic expansion chamber 12 and the cooling equipment 22 to the warming-use heat exchange mechanism 13 as a second fluid to be warmed.

Heating mediums which reach branch pipes 27*a* and 27*b* respectively flow into a trunk pipe 27*d* through a merged portion 27*c*, and is supplied from a second inlet 13*c* to the warming-use heat exchange mechanism 13 as second fluid to be warmed. A pump 27*e* interposed on the branch pipe 27*a* and a pump 27*f* interposed on the branch pipe 27*b* are pumps for allowing heating mediums from both branch pipes 27*a*, 27*b* to flow into the trunk pipe 27*d* after making pressures of heating mediums equal.

Heating medium which flows into the warming-use heat exchange mechanism 13 from the second inlet 13*c* as second fluid to be warmed receives heat energy from river water by the first to third warming-use heat exchangers 34, 35, 36 in the same manner as first fluid to be warmed described previously. Heating medium which is warmed to approximately 10 to 20° C. is discharged from a second outlet 13*d* and reaches a heating medium distributing pipe 42.

The heating medium distributing pipe 42 is a pipe where a proximal end portion of a trunk pipe 42*a* is connected to the second outlet 13*d*, and one branch pipe 42*c* is connected to an inlet 23*a* of the warming equipment 23 through a flow dividing portion 42*b*, and the other branch pipe 42*d* is connected to a heating part inlet 10*c* of the evaporation chamber 10 through the flow dividing portion 42*b*. The heating medium distributing pipe 42 supplies heating medium to the warming equipment 23 and the heat exchanging part 10*e* of the evaporation chamber 10.

The warming equipment 23 is not particularly limited as described previously. In this embodiment, however, the warming equipment 23 is formed of a warming storage. The warming equipment 23 includes a compression pump 23*d* which is interposed on an intermediate portion of the branch pipe 42*c* of the heating medium distributing pipe 42. The compression pump 23*d* is configured to increase a temperature of heating medium to a high temperature by compression and to introduce this heating medium into the warming equipment 23 as a heat medium.

Heating medium flow paths formed in a shape which allows the heating medium flow paths to have high heat exchange efficiency are exposed in the warming equipment 23. Heat is taken away from heating medium which is supplied as a heating medium by driving fans 23*c* disposed in the respective heating medium flow paths so that the inside of the warming equipment 23 can be warmed. Heating medium which is warmed by the warming equipment 23 is discharged from the outlet 23*b*, and is supplied to the inside of the pressure adjustment tank 24 from the inlet 24*a* through the adjustment tank supply pipe 29. Symbol 29*a* indicates a check valve for preventing a reverse flow of heating medium from the pressure adjustment tank 24 to the warming equipment 23.

On the other hand, heating medium which flows into the branch pipe 42*d* of the heating medium distributing pipe 42 is compressed by a compression pump 42*e* and is supplied to the heat exchanging part 10*e* of the evaporation chamber 10 from the heating part inlet 10*c* as a heating medium having a higher temperature.

A heat exchange is performed between heating medium supplied to the heat exchanging part 10*e* and a working fluid in a liquid phase in the evaporation chamber 10. Accordingly, working fluid is heated and heated working fluid is discharged from the heating part outlet 10*d*. This heating medium reaches the inside of the pressure adjustment tank 24 from the inlet 24*b* through the adjustment tank supply pipe 30. Symbol 30*a* indicates a check valve for preventing a reverse flow of heating medium from the pressure adjustment tank 24 to the heat exchanging part 10*e* of the evaporation chamber 10.

The pressure adjustment tank 24 is a tank for performing the pressure adjustment between heating medium in a gas state which flows into the pressure adjustment tank 24 from the inlet 24*a* and heating medium in a gas state which flows into the pressure adjustment tank 24 from the inlet 24*b*. In allowing heating medium to flow into the pressure adjustment tank 24 from the inlet 24*a* or the inlet 24*b*, either one or both of the check valve 29*a* and the check valve 30*a* may be interposed as described previously, or a pump for pressure adjustment may be interposed on the adjustment tank supply pipe 29 or the adjustment tank supply pipe 30 when necessary.

Working fluid which is temporarily stored in the pressure adjustment tank 24 reaches the intermediate portion 17*b* from the discharge port 24*c* through the heating medium return flow pipe 31, and returns to the working fluid gas supply pipe 17 as working fluid again. A return flow compression pump 25 is interposed on the heating medium return flow pipe 31 so as to return heating medium to the working fluid gas supply pipe 17 again. That is, the return flow compression pump 25 is interposed on the heating medium return flow pipe 31 (heating medium return flow path) for making the heating medium which flows through the warming equipment and the heat exchanging part 10*e* of the evaporation chamber 10 merge with working fluid flowing through the working fluid gas supply pipe 17 (working fluid flow path) disposed between the evaporation chamber 10 and the power generating part 11. The return flow compression pump 25 plays a role of a return flow compression means which compresses heating medium to a pressure equal to or more than a pressure of working fluid which flows through the working fluid gas supply pipe 17

(working fluid flow path) disposed between the evaporation chamber 10 and the power generating part 11. A check valve may be disposed on the working fluid gas supply pipe 17 for preventing a reverse flow of heating medium (working fluid) which flows into the working fluid gas supply pipe 17 through the heating medium return flow pipe 31 at an upstream side of the intermediate portion 17b.

With the electric power generating system A having such a configuration, recovery efficiency of energy is improved compared to the prior art and, further, it is possible to generate not only cold heat but also warm heat.

In the electric power generating system A, the turbine device 15 is used as a power generating means in the power generating part 11. However, the power generating means is not limited to the turbine device 15. As the inventor of the present invention proposed in FIG. 6 of patent literature 2 described previously, an adiabatic reciprocating cylinder may be adopted as the power generating means.

Figure 2:
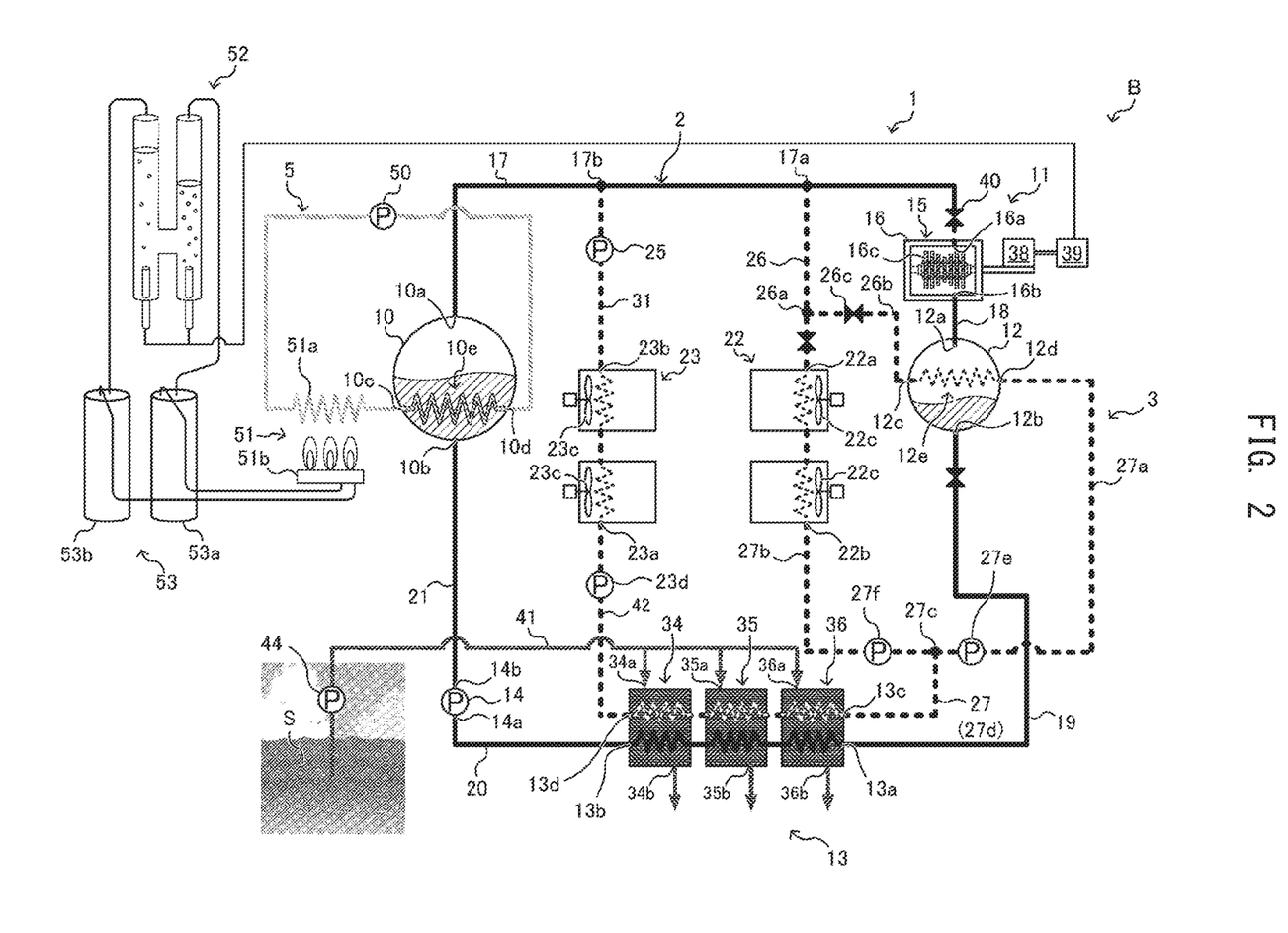
FIG. 2 is an explanatory view showing a configuration of an electric power generating system according to a second embodiment.

Next, an electric power generating system B according to a second embodiment is described with reference to FIG. 2. In the description made hereinafter, there may be cases where constitutional elements which are equal to the corresponding constitutional elements described in the first embodiment are described using the same symbols and the description of the constitutional elements is omitted. Temperatures, pressures and the like of working fluid and respective heating, warming and cooling mediums are substantially equal to the corresponding values used in the electric power generating system A. However, such values may be changed when necessary.

The electric power generating system B has substantially the same configuration as the electric power generating system A described above. However, the electric power generating system B differs from the electric power generating system A with respect to following configurations.

the configuration that sea water is used as warming-use fluid which is supplied to a warming-use heat exchange mechanism 13 the configuration that heating medium (second fluid to be warmed) discharged from a warming-use heat exchange mechanism 13 in a sub circuit 3 is not supplied to a heat exchanging part 10e of an evaporation chamber 10 and is supplied only to a warming equipment 23.

the configuration that the electric power generating system B includes an independent evaporation chamber heating and circulating circuit which circulates heating fluid while supplying heating fluid to a heat exchanging part 10e of the evaporation chamber 10 the configuration that a heat source for the evaporation chamber heating and circulating circuit is combustion of hydrogen and oxygen obtained by electrolysis of water using electric power generated by the power generating part 11.

The respective configurations are specifically described hereinafter. First, in the electric power generating system B, as warming-use fluid which is supplied to first to third warming-use heat exchangers 34, 35, 36 of the warming-use heat exchange mechanism 13, sea water which is pumped up from sea S by a water supply pump 44 is used.

Accordingly, cooled sea water can be obtained from respective outlets 34b, 35b, 36b of the first to third warming-use heat exchangers 34, 35, 36. This cooled sea water is used for feeding and farming of a marine life, for example.

In the electric power generating system B, heating medium discharged from a second outlet 13d in a sub circuit 3 is introduced into only a warming equipment 23.

Accordingly, compared to the electric power generating system A which supplies heating medium also to a heat exchanging part 10e of the evaporation chamber 10 as a heating medium, in the electric power generating system B, a larger amount of heat can be supplied by the heating equipment 23 so that warming ability of the warming equipment 23 can be further enhanced.

The electric power generating system B includes the independent evaporation chamber heating and circulating circuit 5 indicated by a meshed bold line. The evaporation chamber heating and circulating circuit 5 is provided for supplying heating-use fluid to the heat exchanging part 10e of the evaporation chamber 10 and for circulating heating fluid.

The evaporation chamber heating and circulating circuit 5 includes: a circulation pump 50, a heat receiving part 51; and a heat exchanging part 10e of the evaporation chamber 10. The evaporation chamber heating and circulating circuit 5 is formed by connecting these components by a heating-use fluid flow path. Although not shown in the drawing, for the sake of convenience of the description, a tank or the like which buffers heating-use fluid is suitably disposed on the evaporation chamber heating and circulating circuit 5. Heating-use fluid is not particularly limited. However, in this embodiment, water is used as heating-use fluid.

The circulation pump 50 is a pump for circulating water which is heating-use fluid in the system of the evaporation chamber heating and circulating circuit 5.

The heat receiving part 51 is formed of a heat exchanging part 51a and a combustion device 51b. The heat receiving part 51 is configured such that heat obtained by the combustion in the combustion device 51b is received by the heat exchanging part 51a, and a temperature of water which is heating-use fluid flowing through the heat exchanging part 51a can be increased by the received heat.

Heating-use fluid which has passed through the heat exchanging part 51a of the heat receiving part 51 (for example, a temperature of heating fluid being increased to 90 to 95° C. in this embodiment) reaches the heat exchanging part 10e of the evaporation chamber 10 from the heating part inlet 10c, heats a liquid phase portion of working fluid stored in the evaporation chamber 10 so as to give heat energy to the liquid phase portion. At this point of time, a pressure of a gas phase portion of the evaporation chamber 10 becomes approximately 25 to 33 atmospheric pressure, for example.

Heating-use fluid which has passed through the heat exchanging part 10e is discharged from a heating part outlet 10d and, again, is supplied to the heat receiving part 51 through the circulation pump 50 and circulates.

A heat source in the evaporation chamber heating and circulating circuit 5, that is, the combustion in the combustion device 51b is the combustion of hydrogen and oxygen obtained by electrolysis of water performed using electric power generated by the power generating part 11.

More specifically, the electric power generating system B includes an electrolysis device 52, and storage equipment 53.

The electrolysis device 52 is a device provided for generating hydrogen and oxygen by electrolysis of water using electric power generated by an electric power generator 39. An H pipe is schematically illustrated as a typical example of the electrolysis device 52 in FIG. 2. However, the mode of the electrolysis device 52 is not particularly limited.

The storage equipment 53 is equipment for storing hydrogen and oxygen generated by the electrolysis device 52, and includes a hydrogen tank 53a and an oxygen tank 53b.

Hydrogen and oxygen can be suitably stored in or taken out from the hydrogen tank 53a and the oxygen tank 53b respectively, and hydrogen and oxygen taken out from the hydrogen tank 53*a* and the oxygen tank 53*b* are supplied to the combustion device 51*b* as fuels and are used for combustion in the combustion device 51*b*.

The electric power generating system B having such a configuration exhibits favorable energy recovery efficiency compared to the prior art and, further, can generate not only cold heat but also warm heat.

Further, the electric power generating system B is configured such that hydrogen and oxygen generated by the electrolysis device 52 are storable in the storage equipment 53. Accordingly, for example, even in the case where surplus electric power is generated in the electric power generator 39, the surplus energy can be stored in a state of hydrogen and oxygen, and the energy can be used for other usages when necessary.

Figure 3:
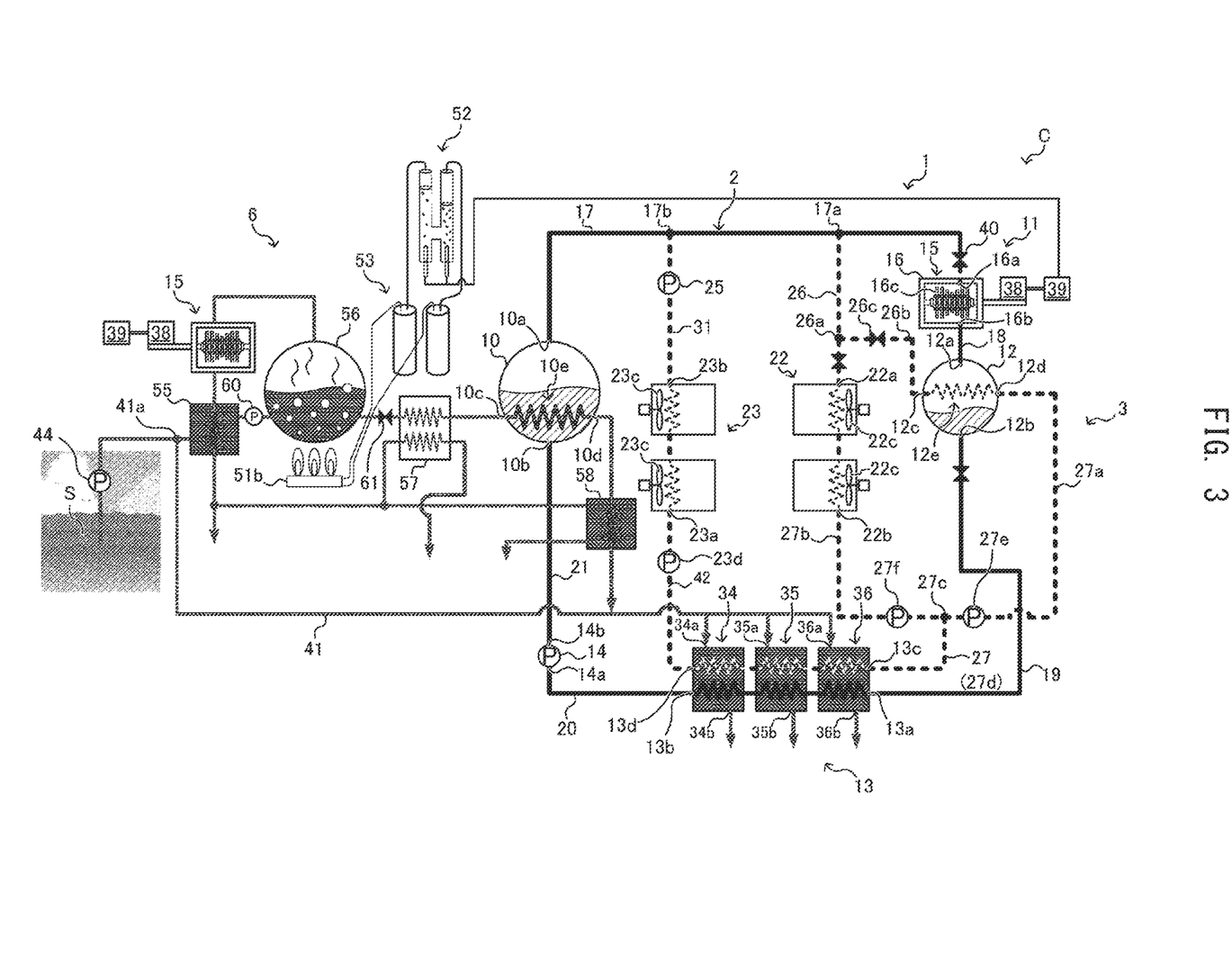
FIG. 3 is an explanatory view showing a configuration of an electric power generating system according to a third embodiment.

Next, an electric power generating system C according to a third embodiment is described with reference to FIG. 3.

The electric power generating system C has substantially the same configuration as the electric power generating system B described above. However, the electric power generating system C mainly differs from the electric power generating system A with respect to a configuration that heating fluid is supplied through an evaporation chamber heating circuit 6 which is branched from a warming fluid supply pipe 41 instead of the evaporation chamber heating and circulating circuit 5 described above where the heating liquid is circulated independently.

This configuration is specifically described. First, in the electric power generating system C, an evaporation chamber heating circuit 6 is connected to an intermediate portion 41*a* of the warming fluid supply pipe 41.

The evaporation chamber heating circuit 6 includes: a fourth heat exchanger 55; a boiler device 56; a turbine device 15; a fifth heat exchanger 57; a heat exchanging part 10*e* of the evaporation chamber 10; and a sixth heat exchanger 58. The evaporation chamber heating circuit 6 is formed by communicably connecting these components with each other through a water flow path.

Sea water which is lifted up by the water supply pump 44 is introduced into a fourth heat exchanger 55 from an intermediate portion 41*a* of a warming fluid supply pipe 41. In the fourth heat exchanger 55, a heat exchange is performed between sea water and vapor which has passed through a turbine device 15 described later so that sea water is warmed.

Next, sea water which is warmed by the fourth heat exchanger 55 is introduced into the boiler device 56 through a supply pump 60. The supply pump 60 is a pump provided for supplying sea water into the boiler device 56 in a high pressure state. The boiler device 56 includes a combustion device 51*b* which is similar to the combustion device 51*d* described previously. The boiler device 56A heats and boils sea water introduced in the boiler device 56, and generates vapor. In the boiler device 56, for example, a temperature of a liquid phase is set to 250 to 300° C., and a pressure of a gas phase is set to 60 to 70 atmospheric pressure.

Vapor generated in the boiler device 56 is supplied to the turbine device 15 in a state where vapor is held in a high pressure state. In the same manner as the power generating part 11 of the main circuit 2 described previously, a transmission 38 and an electric power generator 39 are connected to the turbine device 15, and electric power can be generated by power obtained by the turbine device 15.

Vapor has passed through the turbine device 15 is, next, introduced into the fourth heat exchanger 55. In the fourth heat exchanger 55, a heat exchange is performed between vapor and sea water branched from the warming fluid supply pipe 41, and vapor is condensed so that fresh water having a temperature of approximately 25 to 30° C. is produced.

A portion of fresh water produced by a heat exchange performed in the fourth heat exchanger 55 is supplied also to a fifth heat exchanger 57 and a sixth heat exchanger 58. Fresh water supplied to the fifth heat exchanger 57 and the sixth heat exchanger 58 receives heat by a heat exchange so that fresh water (hot water) having a higher temperature can be obtained. For example, a temperature of hot water generated by the fifth heat exchanger 57 becomes approximately 70 to 80° C., and a temperature of hot water generated by the sixth heat exchanger 58 becomes approximately 60 to 70° C.

On the other hand, a portion of a liquid phase of sea water boiling in the boiler device 56 is supplied to the fifth heat exchanger 57 through a pressure reducing valve 61, and is used as a heat source for producing fresh water of a high temperature. The pressure reducing valve 61 is valve for lowering a water pressure so as to supply a liquid phase (sea water) in the boiler device 56 into the fifth heat exchanger 57, and plays a role of maintaining a back pressure for holding the inside of the boiler device 56 at a high pressure.

Sea water of a high temperature (for example, 85 to 95° C.) has passed through the fifth heat exchanger 57 is, next, supplied to a heat exchanging part 10*e* of the evaporation chamber 10 as heating-use fluid, and heats working fluid stored in the evaporation chamber 10 in the same manner. At this stage of the operation, a pressure in the gas phrase portion of the evaporation chamber 10*b* becomes approximately 25 to 33 atmospheric pressure, for example.

Sea water which passes through the heat exchanging part 10*e* of the evaporation chamber 10 and is discharged from the heating part outlet 10*d* is supplied to the sixth heat exchanger 58, and is used as a heat source for producing fresh water of a high temperature again.

A temperature of sea water after sea water is subjected to a heat exchange in the sixth heat exchanger 58 is approximately 50 to 60° C., and such sea water which is subjected to a heat exchange is again merged with heating fluid in the warming fluid supply pipe 41, and merged fluid is supplied to the warming-use heat exchange mechanism 13 as a portion of the warming-use fluid. That is, heat energy is given to warming-use fluid which flows through the warming fluid supply pipe 41, and heat energy recovered by the warming-use heat exchange mechanism 13 circulates in the pressure resistant closed circuit 1 as heat energy of working fluid.

Also with the electric power generating system C having a such a configuration, it is possible to produce not only cold heat but also warm heat with high energy recovery efficiency compared to the prior art.

Further, the configuration is adopted where heating-use fluid which has passed through the evaporation chamber 10 is supplied to the warming-use heat exchange mechanism 13 as warming-use fluid. In other words, the configuration is adopted where water which is heated by heat obtained by the combustion device 51*b* and is used as heating-use fluid passing through the heat exchanging part 10*e* of the evaporation chamber 10 is merged with sea water, and the merged fluid is supplied to the warming-use heat exchange mechanism 13 as warming-use fluid. Accordingly, heat energy can be given to working fluid which forms first fluid to be warmed in the warming-use heat exchange mechanism 13 and hence, the more efficient electric power generation can be realized. Further, heat energy can be also given to heating medium which forms second fluid to be warmed in the warming-use heat exchange mechanism 13 and hence, warming ability in the warming equipment 23 can be further enhanced.

Further, electric power is generated by driving a turbine of the turbine device 15 using vapor generated by heating sea water with heat generated by the combustion device 51b, and distilled water is obtained by condensing vapor obtained through the turbine and hence, it is possible to produce fresh water from sea water by making use of a portion of generated electric power, and fresh water can be used for beverages and other various applications.

As has been described above, according to the electric power generating system of this embodiment, there is provided the electric power generating system where working fluid is circulated in the system of the pressure resistant closed circuit while changing a state of the working fluid, power is generated by converting external heat energy given to the working fluid into kinetic energy, and electric power is generated by driving the electric power generator by the power, wherein the pressure resistant closed circuit includes the main circuit and the sub circuit connected to the main circuit in parallel, the main circuit includes:

the evaporation chamber in which the working fluid in a gas phase and the working fluid in a liquid phase are stored at a temperature near a boiling point and in which a heat exchange can be performed between a heating-use fluid and the working fluid in the liquid phase;

the adiabatic expansion chamber which is configured to liquefy the working fluid supplied from the evaporation chamber due to lowering of a temperature brought about by adiabatic expansion, and in which a heat exchange can be performed between the working fluid which cannot be liquefied by the adiabatic expansion and a liquefied auxiliary fluid;

the power generating part which includes: the power generating means interposed on the intermediate portion of the working fluid flow path which is communicated between the evaporation chamber and the adiabatic expansion chamber; and the electric power generating means configured to generate electric power by power generated by the power generating means;

the warming-use heat exchange mechanism disposed on the intermediate portion of the working fluid flow path which is communicated between the adiabatic expansion chamber and the evaporation chamber, the warming-use heat exchange mechanism configured to warm the working fluid which forms a first fluid to be warmed and a second fluid to be warmed by performing a heat exchange between the working fluid and a warming-use fluid supplied from outside the system of the pressure resistant closed circuit; and the liquefied working fluid return means configured to return the working fluid liquefied by the adiabatic expansion chamber to the evaporation chamber through the warming-use heat exchange mechanism, wherein the sub circuit includes;

the heating medium dividing flow path configured to divide a portion of the working fluid from the working fluid flow path between the evaporation chamber and the power generating part as a heating medium;

a liquefied auxiliary fluid supply path configured to lower a temperature of a divided portion of the heating medium by decreasing a pressure of the divided portion of the heating medium, and configured to supply the divided portion of the heating medium to the adiabatic expansion chamber as the liquefied auxiliary fluid;

the cooling equipment configured to lower a temperature of the other portion of the divided heating medium thus forming the divided heating medium into a refrigerant;

the second fluid-to-be-warmed supply path configured to supply a heating medium which passes through the adiabatic expansion chamber and the cooling equipment to the warming-use heat exchange mechanism as the second fluid to be warmed;

the warming equipment configured to compress the heating medium warmed by the warming-use heat exchange mechanism so as to set a temperature of the heating medium to a higher temperature, and configured to use the heating medium having the higher temperature as a heating medium; and the return flow compression means interposed on the heating medium return flow path where a heating medium which passes through the warming equipment is merged to the working fluid flow path between the evaporation chamber and the power generating part, and is configured to compress the heating medium to a pressure equal to or more than a pressure of the working fluid which flows through the working fluid path between the evaporation chamber and the power generating part. With such a configuration, compared to the prior art, favorable energy recovery efficiency can be obtained, and not only cold heat but also warm heat can be produced.

Lastly, the above-mentioned respective embodiments are merely an example of the present invention, and the present invention is not limited to the above-mentioned embodiments. Accordingly, provided that embodiments other than the above-mentioned embodiments do not depart from the technical concept of the present invention, it is needless to say that various modifications of the present invention are conceivable depending on designs and the like.

REFERENCE SIGNS LIST

1: pressure resistant closed circuit
2: main circuit
3: sub circuit
5: evaporation chamber heating and circulating circuit
6: evaporation chamber heating circuit
10: evaporation chamber
10e: heat exchanging part
11: power generating part
12: adiabatic expansion chamber
12e: heat exchanging part
13: warming-use heat exchange mechanism
14: return pump
15: turbine device
22: cooling equipment
23: warming equipment
23d: compression pump
25: return flow compression pump
26: heating medium dividing and distributing pipe
27: refrigerant merge and supply pipe
28: heating medium distributing pipe
31: heating medium return flow pipe
51b: combustion device
52: electrolysis device
53: storage equipment
56: boiler device
A to C: electric power generating system

The invention claimed is:

1. An electric power generating system where working fluid is circulated in a system of a pressure resistant closed circuit while changing a state of the working fluid, power is generated by converting external heat energy given to the working fluid into kinetic energy, and electric power is generated by driving an electric power generator by the power, wherein the pressure resistant closed circuit includes a main circuit and a sub circuit connected to the main circuit in parallel, the main circuit includes:

an evaporation chamber in which the working fluid in a gas phase and the working fluid in a liquid phase are stored at a temperature near a boiling point and in which a heat exchange can be performed between a heating-use fluid and the working fluid in the liquid phase;

an adiabatic expansion chamber which is configured to liquefy the working fluid supplied from the evaporation chamber due to lowering of a temperature brought about by adiabatic expansion, and in which a heat exchange can be performed between the working fluid which cannot be liquefied by the adiabatic expansion and a liquefied auxiliary fluid;

a power generating part which includes: a power generating means interposed on an intermediate portion of the working fluid flow path which is communicated between the evaporation chamber and the adiabatic expansion chamber; and an electric power generating means configured to generate electric power by power generated by the power generating means;

a warming-use heat exchange mechanism disposed on an intermediate portion of a working fluid flow path which is communicated between the adiabatic expansion chamber and the evaporation chamber, the warming-use heat exchange mechanism configured to warm the working fluid which forms a first fluid to be warmed and a second fluid to be warmed by performing a heat exchange between the working fluid and a warming-use fluid supplied from outside a system of the pressure resistant closed circuit; and a liquefied working fluid return means configured to return the working fluid liquefied by the adiabatic expansion chamber to the evaporation chamber through the warming-use heat exchange mechanism, wherein the sub circuit includes:

a heating medium dividing flow path configured to divide a portion of the working fluid from a working fluid flow path between the evaporation chamber and the power generating part as a heating medium;

a liquefied auxiliary fluid supply path configured to lower a temperature of a divided portion of the heating medium by decreasing a pressure of the divided portion of the heating medium, and configured to supply the divided portion of the heating medium to the adiabatic expansion chamber as the liquefied auxiliary fluid;

a cooling equipment configured to lower a temperature of an other portion of the divided heating medium by reducing a pressure thus forming the divided heating medium into a refrigerant;

a second fluid-to-be-warmed supply path configured to supply a heating medium which passes through the adiabatic expansion chamber and the cooling equipment to the warming-use heat exchange mechanism as the second fluid to be warmed;

a warming equipment configured to compress the heating medium warmed by the warming-use heat exchange mechanism so as to set a temperature of the heating medium to a higher temperature, and configured to use the heating medium having the higher temperature as a heating medium; and a return flow compression means interposed on a heating medium return flow path where a heating medium which passes through the warming equipment is merged to the working fluid flow path between the evaporation chamber and the power generating part, and is configured to compress the heating medium to a pressure equal to or more than a pressure of the working fluid which flows through a working fluid flow path between the evaporation chamber and the power generating part.

2. The electric power generating system according to claim 1, further comprising a heating medium distributing path configured to supply a portion of the heating medium warmed by the warming-use heat exchange mechanism to the warming equipment by compression, and configured to compress a remaining portion of the heating medium thus forming a higher temperature remaining portion of the heating medium and to supply the higher temperature remaining portion of the heating medium to the evaporation chamber as a heating-use fluid.

3. The electric power generating system according to claim 1, further comprising:

a water electrolysis device configured to generate hydrogen and oxygen by electrolyzing water by a portion of electric power obtained by the power generating part; and a combustion device configured to obtain heat by combusting generated hydrogen and oxygen, wherein predetermined fluid is heated by heat obtained by the combustion device, and the fluid is supplied to the evaporation chamber as a heating-use fluid.

4. The electric power generating system according to claim 3, wherein the electric power generating system is configured such that the heating-use fluid which has passed through the evaporation chamber is supplied to the warming-use heat exchange mechanism as the warming-use fluid.

5. The electric power generating system according to claim 3, further comprising a storage equipment which stores hydrogen and oxygen generated by the water electrolysis device.

6. The electric power generating system according to claim 3, wherein electric power is generated by driving a turbine using vapor generated by heating of water using heat obtained by the combustion device, and distilled water is obtained by condensing vapor obtained through the turbine.

* * * * *